March 3, 1942.　　G. KILIAN ET AL　　2,274,986
DRAWING SHEET GLASS
Filed June 9, 1939　　4 Sheets-Sheet 1

Inventors
G. Kilian &
R. Strohschneider
By: Glascock Downing Seebold
Attys.

Inventors
G. Kilian +
R. Strohschneider

By: Glascock Downing & Seebold
Attys.

Patented Mar. 3, 1942

2,274,986

UNITED STATES PATENT OFFICE 2,274,986

DRAWING SHEET GLASS

Georg Kilian, Weiden/Opf, and Robert Strohschneider, Nuremberg, Germany, assignors to Deutsche Tafelglas Aktiengesellschaft (Detag), Fürth i. B., Germany Application June 9, 1939, Serial No. 278,360
In Germany June 13, 1938

6 Claims. (Cl. 13—6)

In mechanical sheet-glass drawing processes, and more particularly in the Fourcault process, it is already known that the running period of such machines is limited. This is due to the fact that a very viscous glass mass forms in the drawing chamber, which has to be melted down again after the machine is tilted. Furthermore, devitrifications occur at the corners of the nozzle aperture, which are due to thermal inequalities. Apart from the drop in production that results when a machine is out of action, the material of the drawing chamber and of the drawing nozzles is affected by repeated heating up. Furthermore, the other drawing machines built on to the furnace are affected when a machine is idle, because obviously the flow of glass in the trough is altered thereby.

With the object of overcoming these disadvantages attempts have been made to prevent the glass mass from cooling off in the draw chamber by insulating the draw hearth. Also the bottom heating thereof has been attempted, especially in the case of flat glass hearths. The use of electrical resistances and the passage of electric currents through the bath has also been suggested, but hitherto without any satisfactory result.

It has now been found that the running period of a drawing machine can be extended considerably if heating is effected by pasing an electric current through the glass bath below the drawing nozzle in such a way that the tip of at least one of the electrodes, which are heating the glass bath by means of alternating current, is located approximately vertically below each end of the slot of the drawing nozzle or of the sheet-glass root. In this process electrodes made of Siemens-Martin steel of low carbon content are preferably used, which, contrary to what might have been expected, do not discolour the glass bath. According to a further feature of the invention the ends of these electrodes may be pointed. By this means a desired higher current density is obtained at the ends of the electrodes, and the changing of the electrodes is also facilitated, because when these pointed electrodes are inserted they can be easily pushed through the cooler mass of glass at the sides of the trough.

Additional electrodes may be built into the glass bath, amongst which a separate flow of current takes place, these electrodes being arranged in those positions in the drawing hearth that are particularly exposed to the danger of cooling, which occurs especially at the edges and corners of the drawing hearth.

The invention also consists in the use of polyphase current, because in this case the power required for keeping the glass bath in the hearth hot is very considerably less than is the case with single-phase or direct current. The use of a known type of transformer in which the primary and secondary windings are entirely separate from one another electrically is of particular importance.

The invention is illustrated by way of example in the accompanying drawings, in which Figure 1 shows a vertical longitudinal section through the drawing chamber and hearth;

Figure 1:
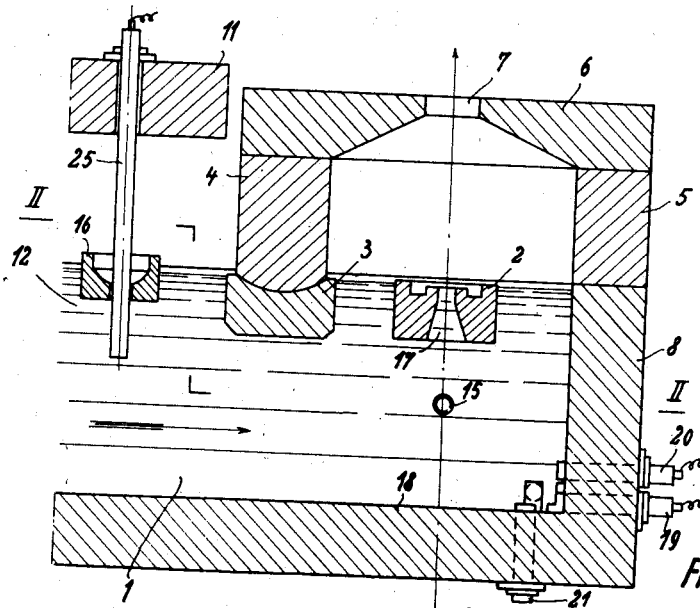

In these figures, 1 is the drawing hearth and the connection to the melting trough, and 2 is the nozzle usual in the Fourcault process, which however may be replaced by any other known arrangement for holding the root of the glass strip at the same place and for maintaining the width of the said glass strip. 3 indicates the floating bridge member which serves for separating the drawing chamber from the trough. 4 and 5 are the side walls of the drawing chamber. The covers 6 form the top closure thereof, and the glass strip passes through an aperture 7 therein to a cooling shaft located above it. 8 is the rear wall of the drawing hearth, 9 and 10 are the side walls, and 18 is the bottom thereof. 11 is a dome closing an inlet channel 12 leading to the drawing chamber 1.

Figure 2:
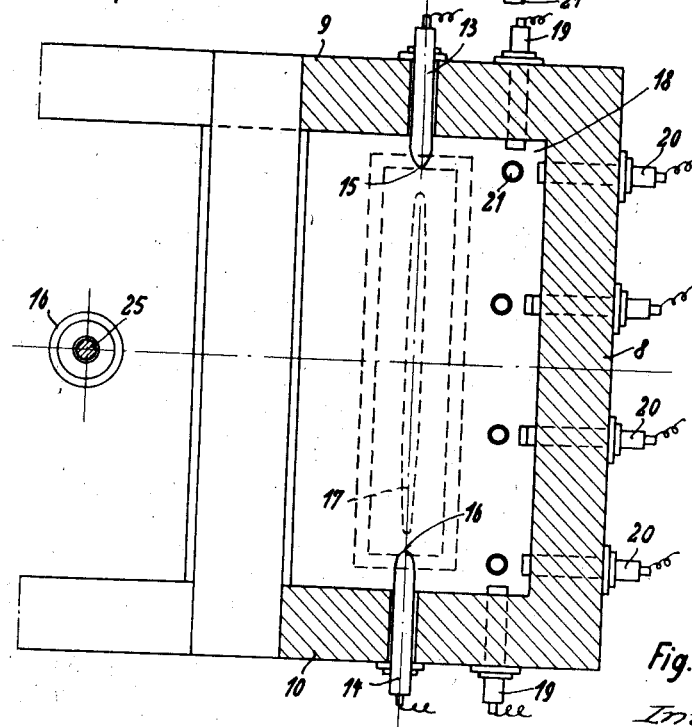
Figure 2 shows a horizontal section through the drawing hearth on the line II—II in Figure 1.

In Figures 1 and 2, electrodes 13 and 14 are inserted in the side walls 9 and 10 of the drawing hearth, and the ends of the said electrodes are located approximately below the ends of the slot 17 of the drawing nozzle 2, as may be clearly seen in Figures 2 and 4, and for the arrangement with three electrodes, which is described later, in Figures 6 and 7. The devitrifications occur mainly at this point, and owing to the high ohmic resistance at this point the emission of heat is particularly strong, and consequently these especially endangered places are subjected to additional heating. As shown in Figure 2, for example, the electrodes may be pointed, for the reason already stated.

If three-phase current is used for heating purposes it is advantageous to insert in any part of the glass bath, for example through the closure dome 11, a third electrode 25, to which the third phase is connected. In order to collect the hammer scale that forms on the exposed part of this electrode, a pan 16 floating on the glass bath is preferably used, into which the hammer scale falls, thus keeping the bath clean.

Since devitrifications also form at the corners, that is, between the walls 8 and 10, between the walls 8 and 9, and between the rear wall 8 and the bottom 18 of the drawing trough, it is advisable to provide these particularly exposed places with an additional heating means. In Figures 1 and 2 this additional heating means is shown as a three-phase current heating and for this purpose three co-ordinated electrodes 19, 20 and 21 are provided, which together form a star. By this means the temperature beneath the drawing nozzle, and particularly at the corners thereof, can be controlled, as well as the occurrence of devitrifications, thereby the formation of very viscous glass masses at the corners and edges of the drawing chamber is avoided.

Figure 3:
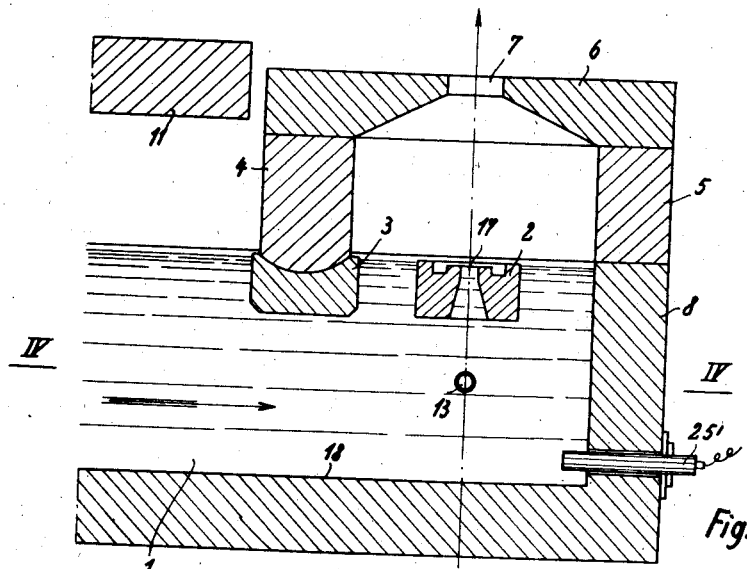
Figure 3 shows a vertical longitudinal section through a drawing chamber and hearth with a different arrangement of the electrodes.
Figure 4:
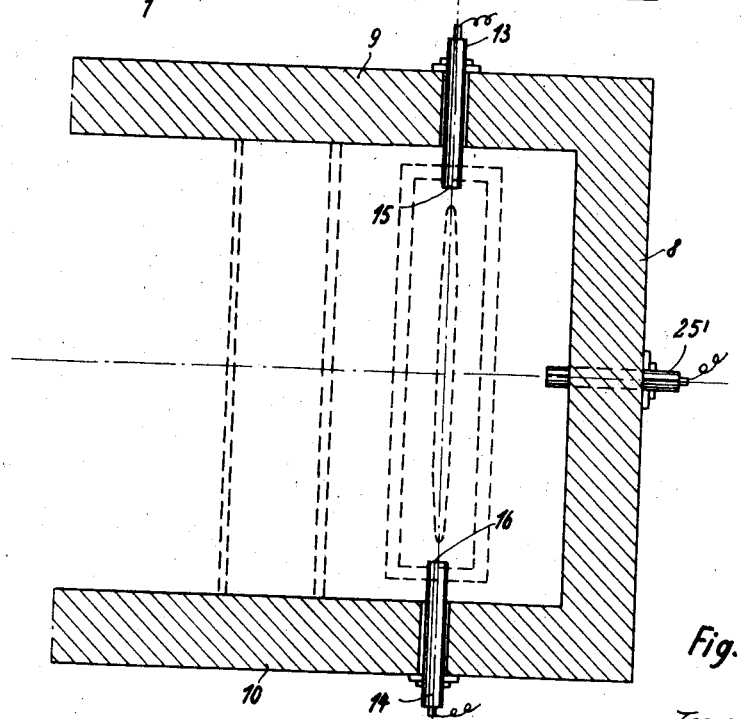
Figure 4 is a horizontal section through the drawing hearth on the line IV—IV in Figure 3.

In the arrangement illustrated in Figures 3 and 4 only the two electrodes 13 and 14 that cooperate with the electrode 25' are shown. As the abovementioned figures clearly show, the electrode 25' projects below the surface of the glass bath, so that with this third electrode no hammer scale can form, and thus the use of a special collecting pan 16 is avoided.

Figure 5:
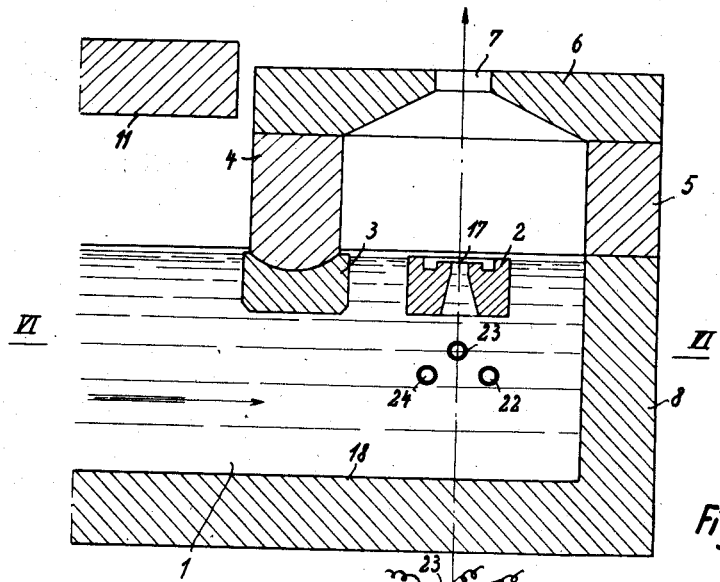
Figure 5 is a vertical longitudinal section showing another arrangement of the electrodes.
Figure 6:
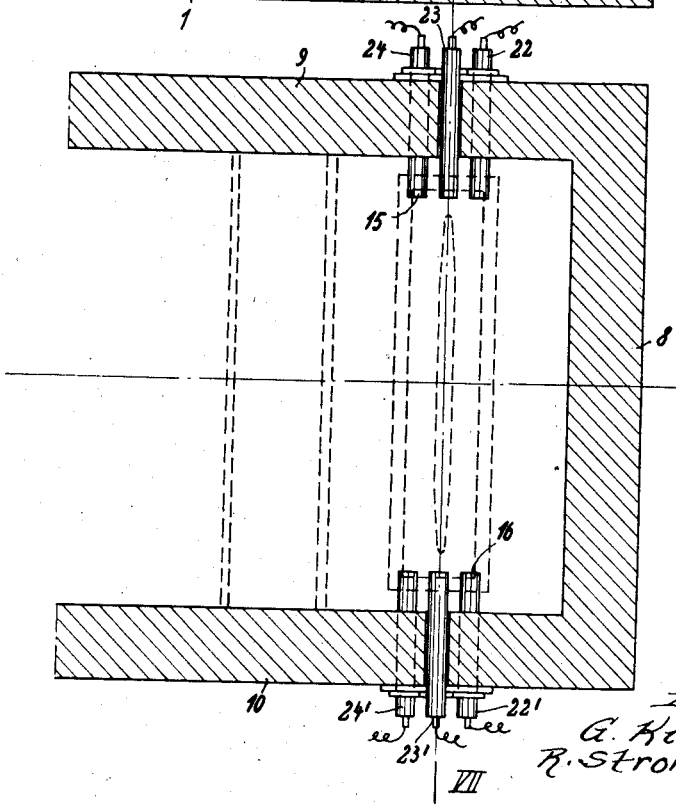
Figure 6 shows a horizontal section on the line VI—VI in Figure 5.
Figure 7:
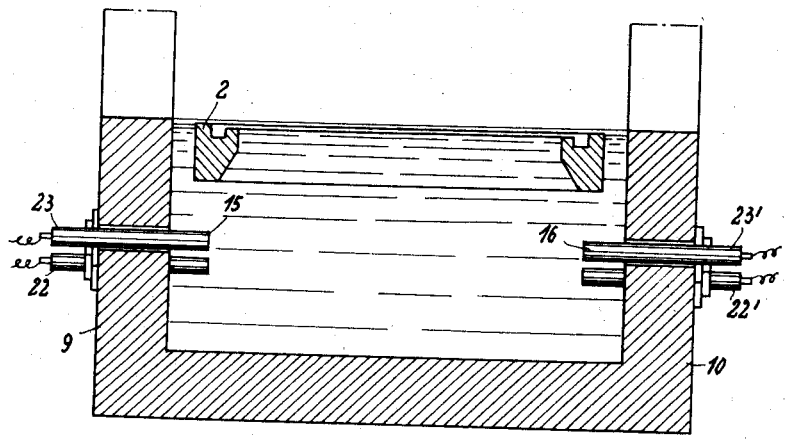
Figure 7 shows a section on the line VII—VII in Figure 6.

Figures 5, 6 and 7 show another method of heating the nozzle according to the invention. In this arrangement each of the corners of the drawing nozzle 2 is heated by three electrodes 22, 23, 24 and 22', 23', 24' which are arranged in star formation.

Heating for the corners and edges of the drawing bath may obviously also be provided in the arrangements according to Figures 3 to 7.

We claim:

1. In apparatus for drawing sheet glass, a hearth having molten glass therein for being drawn as a strip upwardly from the surface of the glass with edges of the glass strip root spaced from opposite walls of the hearth, electrodes extending through the walls of the hearth for heating the glass within the hearth by direct electrical resistance, an end of one of said electrodes terminating substantially vertically below one edge of the glass strip root, an end of another of said electrodes terminating substantially vertically below the other edge of the glass strip root, and means for supplying alternating current to said electrodes.

2. In apparatus for drawing sheet glass, a hearth having molten glass therein for being drawn as a strip upwardly from the surface of the glass with edges of the glass strip root spaced from opposite walls of the hearth, electrodes extending through the walls of the hearth for heating the glass within the hearth by direct electrical resistance, the ends of three of said electrodes terminating substantially vertically below one edge of the glass strip root, the ends of three other of said electrodes terminating substantially vertically below the other edge of the glass strip root, and means for supplying polyphase electric current to said electrodes.

3. In apparatus for drawing sheet glass, a hearth having molten glass therein for being drawn as a strip upwardly from the surface of the glass with edges of the glass strip root spaced from opposite walls of the hearth, a dome member partly covering the hearth, electrodes extending through the walls of the hearth for heating the glass by direct electrical resistance, an end of one of said electrodes terminating substantially vertically below one edge of the glass strip root, an end of another of said electrodes terminating substantially vertically below the other edge of the glass strip root, another electrode extending through said dome member into the glass, a cup member surrounding the last mentioned electrode and floating on the molten glass, and means for supplying polyphase electric current to said electrode.

4. In apparatus for drawing sheet glass, a hearth having molten glass therein for being drawn as a strip upwardly from the surface of the glass with edges of the glass strip root spaced from opposite walls of the hearth, electrodes extending through the walls of the hearth for heating the glass within the hearth by direct electrical resistance, an end of one of said electrodes terminating substantially vertically below one edge of the glass strip root, another of said electrodes terminating substantially vertically below the other edge of the glass strip root, an end of another of said electrodes being arranged below said glass strip root and intermediate ends of the first mentioned electrodes and terminating in the molten glass, and means supplying polyphase electric current to said electrodes.

5. In apparatus for drawing sheet glass, a hearth formed of a plurality of walls arranged at right angles to each other having molten glass therein for being drawn as a strip upwardly from the surface of the glass with edges of the glass strip root spaced from opposite walls of the hearth, electrodes mounted in the walls of the hearth for heating the glass within the hearth by electrical resistance, an end of one of said electrodes terminating substantially vertically below one edge of the glass strip root, an end of another of said electrodes terminating substantially vertically below the other edge of the glass strip root, and other of said electrodes being arranged at the corners of the walls of the hearth and extending into the molten glass, and means for supplying polyphase electric currents to said electrodes.

6. In apparatus for drawing sheet glass, a hearth having molten glass therein for being drawn as a strip upwardly from the surface of the glass with edges of the glass strip root spaced from opposite walls of the hearth, electrodes extending through the walls of the hearth for heating the glass within the hearth by direct electrical resistance, an end of one of said electrodes terminating in a point substantially vertically below one edge of the glass strip root, an end of another of said electrodes terminating in a point substantially vertically below the other edge of the glass strip root, and means supplying alternating current to said electrodes.

GEORG KILIAN.
ROBERT STROHSCHNEIDER.